Oct. 15, 1929.   W. O. LYTLE   1,732,022
PROCESS AND APPARATUS FOR MAKING COMPOSITE GLASS
Filed Feb. 6, 1928   3 Sheets-Sheet 3
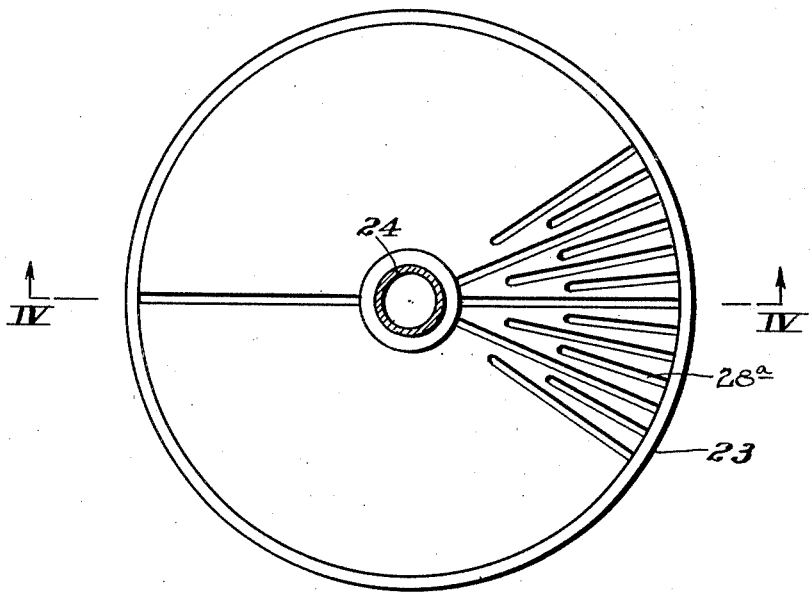
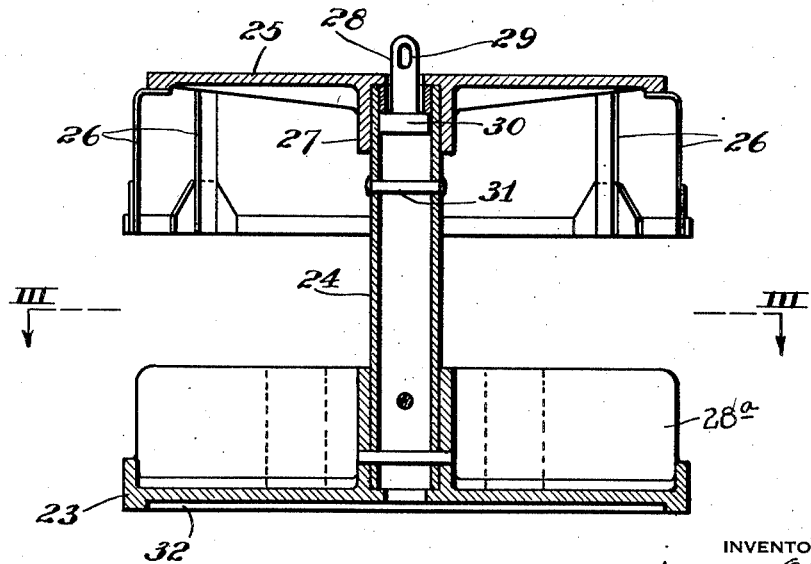

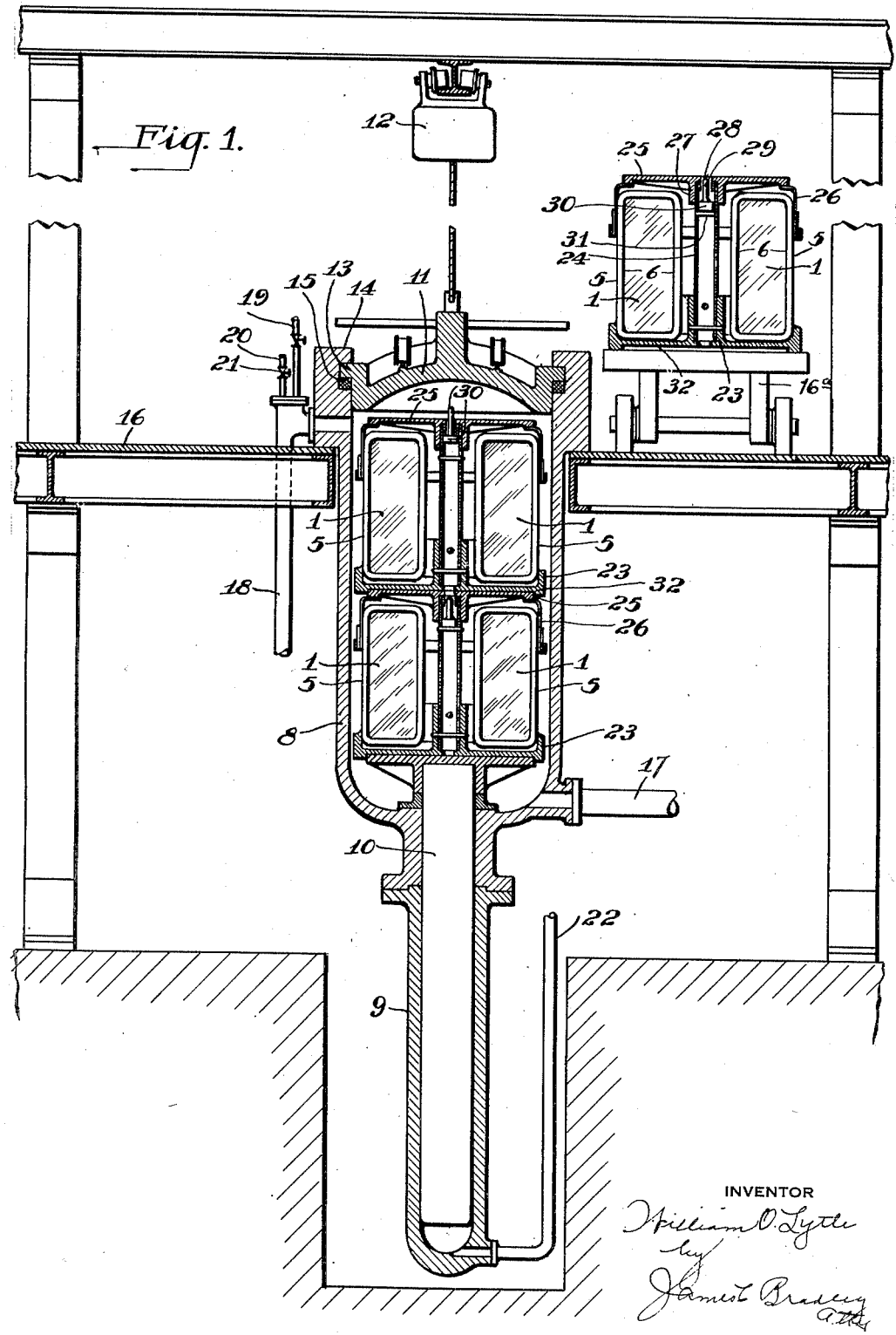

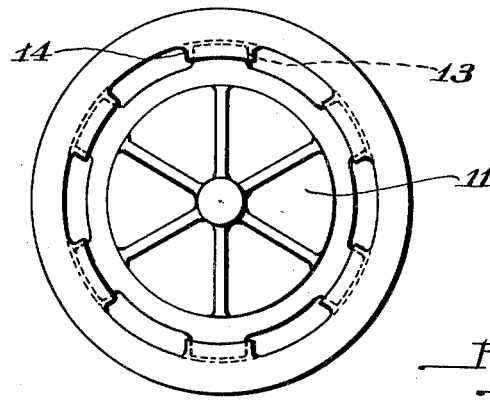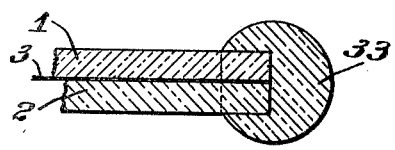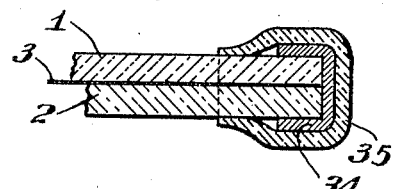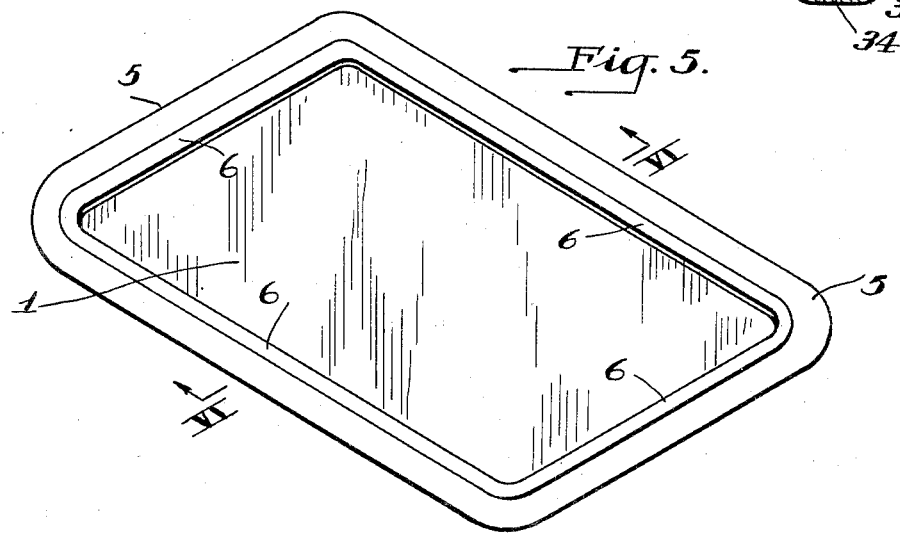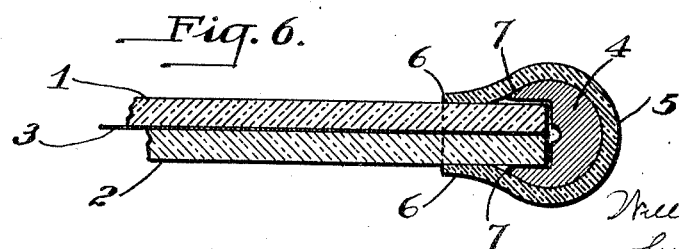

Patented Oct. 15, 1929

1,732,022

UNITED STATES PATENT OFFICE

WILLIAM O. LYTLE, OF NEW KENSINGTON, PENNSYLVANIA, ASSIGNOR TO PITTSBURGH PLATE GLASS COMPANY, A CORPORATION OF PENNSYLVANIA

PROCESS AND APPARATUS FOR MAKING COMPOSITE GLASS

Application filed February 6, 1928. Serial No. 252,205.

The invention relates to a process and apparatus for making composite glass, and particularly to the process and means for applying heat and pressure to cause the joinder between the glass and celluloid. Composite glass ordinarily comprises two sheets of glass with a sheet of celluloid or equivalent cemented therebetween, although a greater or less number of layers of material may be employed. It is preferred to assemble the sheets with a coating of cement, such as gelatin dried upon the surfaces of the glass sheets, which are to be cemented to the celluloid, the heat subsequently applied to the assembled sheets serving to soften the gelatin and secure adhesion when pressure is applied, but it will be understood that the apparatus may be used in other ways. For instance, a sufficient amount of heat and pressure will cause the adherence of the celluloid to the glass without the use of any cement, particularly if a solvent is applied to the celluloid, and the invention may be employed in such way, if desired. The invention has for its primary objects, the provision of a process and apparatus whereby quantity production may be secured with minimum labor incident to placing the assembled plates in the press employed and removing them therefrom; the provision of sealing means for the edges of the sets of plates, to take the place of the rubber bags heretofore used, which call for only a fraction of the outlay required for the rubber bags; the provision of improved and simplified procedure for exhausting the air from inside the sealing means of all of the sets of sheets at one time; and the provision of means for reducing the pressure applied at the edges of the sheets as compared with the bodies thereof, thus preventing the edge portion of the celluloid from being thinned and squeezed around the edges of the composite plate. One embodiment of the apparatus employed is shown in the accompanying drawings, wherein:

Figure 1 is a vertical section through the complete apparatus in position of use. Fig. 2 is a plan view of the cover plate of the press. Fig. 3 is a partial plan view of one of the platforms mounted for movement in the press. Fig. 4 is a section on the line IV—IV of Fig. 3. Figs. 5 and 6 are detail views of the means for securing the glass sheets together and sealing them preliminary to placing them in the press, Fig. 5 being a perspective view and Fig. 6 being a section on the line VI—VI of Fig. 5. And Figs. 7 and 8 are sections through other modifications.

In carrying out the process, the sheets to be joined together are assembled, as indicated in Fig. 6, wherein 1 and 2 are glass sheets and 3 is the interposed sheet of celluloid or other similar material. These plates have been previously treated to prepare them for the pressing operation, such treatment involving the cleaning of the glass and celluloid plates and the application to one side of each of the glass sheets of a thin film of gelatin or other cement. This cement is of such a character that when the celluloid sheet is placed between the two sheets of glass and heat and pressure applied thereto, the cement will be softened and the sheets will be securely attached together when the composite plate is cooled off, it being desirable that this cooling off should occur while the sheets are under pressure. If gelatin is used as a cement, the heat ordinarily applied will be about 250 degrees F. and the pressure about 150 pounds per square inch. The temperature specified is sufficient to slightly soften the celluloid so that the opposing faces of the celluloid and glass are brought into intimate contact. As later described, hydraulic pressure is preferably employed, heated liquid being used, so that the liquid as thus applied not only gives the desired degree of pressure, but also provides a medium for softening the gelatin so that the sheets are heated and pressed at one operation. Under these conditions, it is, of course, necessary that the pressure should be applied to the outer faces of the sheets to be joined, but not to the edges of the sheets where the sheets come into contact, since fluid pressure applied at the lines of joinder between the plates would penetrate the joint and tend to separate them so that the pressure on the faces of the sheets would be ineffective to secure the desired result.

The means employed for preventing the application of fluid pressure to the juncture between the sheets will be readily seen by reference to Figs. 5 and 6. Extending completely around the edges of the sheet (which are of the same size and flush with each other at the edges) is the shielding strip 4. This strip is formed of lead or other composition having a similar degree of ductility, so that the strip or bead can be readily bent around the edge of the set of plates. Lying over the lead strip or bead 4 is the strip of rubber 5 of approximate U-shape in cross section and having its lips 6, 6, which are somewhat thinner than the body of the strip, in engagement with the outer faces of the glass sheets 1 and 2. This strip 5 is preferably molded or formed into a continuous strip so that it may be readily fitted around the bead 4 under tension so that the lips 6, 6, will grip the sides of the glass sheets. This construction serves to hold the three plates securely in assembled position, this holding function being improved by the use of the lips 7, 7 on the lead bead 4, such lips fitting over the side faces of the sheets 1 and 2. This edge device not only holds the sheets in assembled relation, but also performs the essential function heretofore referred to of shielding the junctures between the three sheets from hydraulic pressure when the assembled set is placed inside the pressure tank and exposed to pressure.

This device has some very substantial advantages over the rubber bags heretofore employed for enclosing the glass sheets when inserted into a pressure tank. The rubber bags are not only expensive, but are subject to rapid deterioration and are easily cut by the glass. The lead and rubber strips employed in the construction above described are relatively cheap and can be used over and over again, the rubber being protected from cutting by the lead strip. The device has the further advantage that it serves to hold the sheet securely against slippage while being placed in the pressure tank and removed therefrom. A further advantage is involved in having the pressure of the liquid applied directly to the glass sheets since this liquid also acts as a heating and cooling medium and the heating and cooling is carried on more rapidly when the cooling medium is in direct contact with the glass than when it is insulated therefrom by a rubber wall.

Hydraulic pressure is preferably applied to a large number of the sets of plates at one time in a construction such as that shown in Fig. 1. The press here shown comprises a vertical cylinder 8 provided with a downward extension 9 carrying the plunger 10. The upper end of the cylinder is preferably closed by means of a cover plate 11, which is raised and lowered by a hoist 12. This cover is provided with a plurality of spaced laterally extending lugs 13 adapted to be moved beneath corresponding lugs 14 integral with the upper end of the cylinder 8, the opposing surfaces of the two sets of lugs being slightly inclined so that the head is moved downwardly to clamp the packing 15 as the cover is rotated.

The cylinder is preferably located with its upper end adjacent the floor 16 for carrying the trucks 16ª by means of which the sets of plates are brought to and removed from the press. Hydraulic pressure is supplied to the cylinder through the pipe 18 and this liquid may be withdrawn through the pipe 17. Any suitable means for heating and cooling liquid and circulating it through the pipes 17 and 18 may be employed, such as that shown in the application of John H. Fox and William Owen, Serial Number 155,426. After the pressing operation, it is desirable to drain some of the water from the tank before removing the plates, and in order to admit air to take the place of the water thus removed, an air inlet 19 leading to the pipe 18 is provided having a suitable valve opening to the atmosphere. At this time, the top is taken off and the racks removed, only a small amount of water being drained off. The heat of the water is thus conserved for the next pressing operation. Also connected to the pipe 18 is a suction connection 20 leading to a suitable exhaust system, this connection being controlled by the valve 21. This feature of construction comes into play after the sets of plates are inserted in the cylinder and before the pressing operation. At this time it is desirable, although possibly not essential, to withdraw any air inside the sealing means 4 and 5 and bring the lips 6, 6 into tight contact with the sides of the plates 1 and 2, and this function is accomplished by means of the exhaust connection 20 by means of which the air is exhausted from the interior of the cylinder and any air inside the sealing means 5 is withdrawn. The plunger 10 is moved up by pressure applied through the connection 22 leading into the lower end of the extension 9.

Assembled sets of plates are preferably brought to position adjacent the upper end of the cylinder 8 on the truck 16ª in rack members, such as those shown in detail in Figs. 3 and 4. These rack members comprise the bottom plate or platform 23, a central pipe 24 and a top plate 25, the latter being provided with a depending ring 26. The plate 25 is provided with a flange 27 fitting slidably over the upper end of the pipe so that the plate 25 with its depending flange 26 may be moved up and down. While placing the assembled sheets upon the base plate 23, the top plate 25 is raised so that the ring 26 clears the upper edges of the sheet. After the plate 23 has been filled, the plate 25 is lowered so that the flange 26 extends below the tops of the assembled sheets, as indicated in Fig. 1, thus securely holding them in upright position. The sheets are preferably placed upon the plate or platform 23 in radial position, the upper face of the plate 23 being provided with the grooves 28ª, as indicated in Fig. 3, for receiving the lower ends of the sheets. The sheets are thus easily positioned upon the platform and properly spaced. In order to lift the rack from the truck 16ª, the bolt 28 is employed having the eye 29 and the head 30. When not in use this lifting bolt drops down into the pipe 24 being engaged in its lowest position by means of the stop bolt 31. The rack with its assembled plates is readily moved from the truck 16ª and placed upon the plunger 10 by means of a suitable overhead crane whose hook engages the eye 29 of the lifting bolt. The cylinder 8 is preferably designed so that a series of racks may be placed therein at one time. Only two racks are shown in the particular cylinder illustrated, but it will be understood that this number might be increased, if desired. The racks are constructed so that they rest evenly one upon the other, the lower side of the plate 23 being recessed, as indicated at 32, so as to fit over the plate 25 of the rack next below it. When the cylinder 8 is empty, the upper end of the plunger 10 lies at substantially the level of the top of the truck 16ª so that the rack with its assembled plates may be easily slid or moved into position on the top of the plunger. The plunger is then lowered so that the top plate 25 of the rack is at the level of the bottom of the truck 16ª and another rack is moved into position upon the top of this plate. The plunger 10 is then lowered to the position shown in Fig. 1 and the cover plate 11 of the cylinder is applied and tightened.

As heretofore pointed out, the first step in the operation is the exhausting of the air from the interior of the cylinder 8 which is accomplished by means of the vacuum connection 20. This operation removes the air surrounding the edges of the plates and lying inside of the rubber sealing strips 5, the lips 6, 6 of such strips being at this time brought into tight contact with the outer sides of the glass plates by the suction effect which is applied to the cylinder. Water is now circulated through the cylinder by means of the pipes 17, 18, the temperature being gradually increased until a temperature of about 250 degrees F. is secured in the cylinder. At this time a pressure of about 150 lbs. per square inch is employed to bring the sheets forming the composite plates into tight engagement. The gelatin upon the inner surfaces of the glass plates is softened by the temperature employed and the celluloid is also slightly softened so that a very intimate contact is secured between the opposing surfaces of the plates. After this condition has been maintained for a short time, a circulation of water is again started through the cylinder and the temperature of the circulating water gradually lowered until the plates arrive at a temperature at which they may be easily handled when removed from the cylinder. The pressure is now released and a small amount of the water withdrawn from the cylinder, the air connection 19 being opened to permit of the ready withdrawal of the water. The cover plate 11 can now be removed and the plunger 10 moved upward to permit of the removal of the racks carrying the plates, the upper rack being removed and placed upon a truck, after which the next rack is raised above the top of the cylinder so that it may be readily removed and carried away. The cylinder is now loaded up with two more racks of plates and the cycle repeated. The lead strips 4 and the flexible sealing strips 5, not only protect the joining edges of the sheets against the application of hydraulic pressure, but also protect the margins of the outer faces of the sheets 1 and 2 from the application of such pressure, this protection resulting from the use of the lips 7, 7 on the lead strips. Without this protection, and with the full pressure of the press liquid applied to the margins of the sheets (as occurs where the pressing occurs in the rubber containers heretofore used), there is a tendency of the celluloid, softened by heat, to thin and squeeze out around the edges of the glass sheets. As a result, the glass sheets, which have been sprung in slightly at their edges during the pressing operation, due to the thinning of the celluloid, tend when removed from the press to spring back from each other, thus opening up a crack extending inward a slight distance. This requires that the thinned celluloid shall be moved a fraction of an inch inward and the groove filled with a suitable filler, otherwise, the crack may work inward far enough to ruin the product. The use of the lips 7, 7 obviates this difficulty, the thinning and squeezing out of the celluloid at the edges being entirely avoided. This feature of invention is not limited to use in the particular apparatus shown, being present in the forms of apparatus shown in my two copending applications, Serial Number 252,206 and Serial Number 252,207, of even date herewith.

Fig. 7 illustrates a modification in which the metal strip 4 is dispensed with, and the rubber member 33 used to hold the sheets together and provide a seal against fluid pressure at the juncture of the sheets. If desired, additional clamping means may be employed to hold the sheets against slippage.

Fig. 8 illustrates a further modification in which the relatively stiff channel 34 is used instead of the lead strip of the structures of Figs. 5 and 6. This member fits snugly around the edges of the sheets and is itself surrounded by the U-shaped rubber sealing member 35. One member 34 may be used at each of the edges, or the frame may be made in two pieces only, two of the strips being welded together to form two sides and a corner. The two half frames thus formed are secured together at their meeting edges by any suitable means after being fitted over the glass. The channels 34 resist the fluid pressure which would otherwise be exerted on the margins of the sheets and prevent the celluloid from being thinned and squeezed out from between the glass sheets at the edges.

What I claim is:

1. A process for applying pressure to a set of sheets of similar size to form a composite sheet, which consists in assembling the sheets with their edges flush, shielding the edges of the sheets where they join against the application of fluid pressure, while leaving the major portion of the outer faces of the outer sheets of the set exposed, and applying fluid pressure on all sides of the set as thus assembled.

2. A process for applying pressure to a set of sheets of similar size to form a composite sheet, which consists in assembling the sheets with their edges flush, shielding the edges of the sheets where they join against the application of fluid pressure, while leaving the major portion of the outer faces of the outer sheets of the set exposed, applying suction to the shielded edges, and applying fluid pressure on all sides of the set as thus assembled.

3. A process for applying pressure to a set of sheets of similar size to form a composite sheet, which consists in assembling the sheets with their edges flush, shielding the edges of the sheets where they join against the application of fluid pressure, while leaving the major portion of the outer faces of the outer sheets of the set exposed, and applying heated fluid on all sides of the set of sheets as thus assembled.

4. A process for applying pressure to a set of sheets of similar size to form a composite sheet, which consists in assembling the sheets with their edges flush, shielding the edges of the sheets where they join against the application of fluid pressure, but free to the application of suction, while leaving the major portion of the outer faces of the outer sheets of the set exposed, and finally applying suction and pressure successively on all sides of the set of sheets as thus assembled.

5. A process for applying pressure to a set of sheets of similar size to form a composite sheet, which consists in assembling the sheets with their edges flush, shielding the edges of the sheets where they join against the application of fluid pressure, but free to the application of suction, and finally applying suction and pressure successively on all sides of the set of sheets.

6. In combination in apparatus for use in securing together a set of sheets of similar size arranged in a pile with their edges flush to form a plate of composite glass, a shielding strip of relatively hard material extending around the edges of the sheets and lying over the joinder between the sheets, and a strip of flexible material of general U-shape fitting over the shielding strip with its edges in engagement with the outer faces of the outer sheets.

7. In combination in apparatus for use in securing together a set of sheets of similar size arranged in a pile with their edges flush to form a plate of composte glass, a shielding strip of relatively hard material extending around the edges of the sheets and lying over the joinder between the sheets, and a strip of flexible material of general U-shape fitting over the shielding strip with its edges in engagement with the outer faces of the outer sheets, said shielding strip having its side edges overlapping slightly the outer faces of the two outer sheets of the set to hold the sheets in assembled relation.

8. In combination in apparatus for use in securing together a set of sheets of similar size arranged in a pile with their edges flush to form a plate of composite glass, a shielding strip of relatively hard material extending around the edges of the sheets and lying over the joinder between the sheets, and a strip of flexible material of general U-shape fitting over the shielding strip with its edges in engagement with the outer faces of the outer sheets, said shielding strip having its side edges extending slightly outside the planes of the outer faces of the two outer sheets of the set.

9. In combination in apparatus for use in securing together a set of sheets of similar size arranged in a pile with their edges flush to form a plate of composite glass, a shielding strip of flexible metal composition extending around the edges of the sheets and lying over the joinder between the sheets, and a strip of flexible material of general U-shape fitting over the shielding strip with its edges in engagement with the outer faces of the outer sheets.

10. In combination in apparatus for use in securing together a set of sheets of similar size arranged in a pile with their edges flush to form a plate of composite glass, a shielding strip of relatively hard material extending around the edges of the sheets and lying over the joinder between the sheets, a strip of flexible material of general U-shape fitting over the shielding strip with its edges in engagement with the outer faces of the outer sheets, a pressure chamber surrounding the sheet as thus assembled, and means for applying fluid pressure to said chamber.

11. In combination in apparatus for use in securing together a set of sheets of similar size arranged in a pile with their edges flush to form a plate of composite glass, a shielding strip of relatively hard material extending around the edges of the sheets and lying over the joinder between the sheets, a strip of flexible material of general U-shape fitting over the shielding strip with its edges in engagement with the outer faces of the outer sheets, a pressure chamber surrounding the sheet as thus assembled, and means for successively applying suction and fluid pressure to said chamber.

12. A process for securing together a set of sheets comprising a pair of glass sheets and an interposed sheet of tough, transparent material subject to deformation under heat and pressure, which consists in assembling the sheets with their edges substantially flush, shielding the edges of the sheets where they join against the application of fluid pressure, and applying pressure and heat to the outer faces of the outer sheets, the pressure applied to the margins of such outer faces being substantially less than that applied to said faces inward from said margins.

13. A process for securing together a set of sheets comprising a pair of glass sheets and an interposed sheet of tough, transparent material subject to deformation under heat and pressure, which consists in assembling the sheets with their edges substantially flush, shielding the edges of the sheets where they join against the application of fluid pressure, also shielding the extreme margins of the outer faces of the outer sheets against the application of pressure, and applying pressure to said outer faces inward of said margins.

In testimony whereof, I have hereunto subscribed my name this 27th day of January, 1928.

WILLIAM O. LYTLE.